(12) United States Patent
Hashemian

(10) Patent No.: US 9,797,787 B2
(45) Date of Patent: *Oct. 24, 2017

(54) SYSTEMS AND METHODS OF MEASURING TEMPERATURE IN INDUSTRIAL ENVIRONMENTS

(71) Applicant: Analysis and Measurement Services Corporation, Knoxville, TN (US)

(72) Inventor: Hashem M. Hashemian, Knoxville, TN (US)

(73) Assignee: Analysis and Measurement Services Corporation, Knoxville, TN (US)

(*) Notice: Subject to any disclaimer, the term of this patent is extended or adjusted under 35 U.S.C. 154(b) by 595 days.

This patent is subject to a terminal disclaimer.

(21) Appl. No.: 14/454,216

(22) Filed: Aug. 7, 2014

(65) Prior Publication Data
US 2014/0348208 A1  Nov. 27, 2014

Related U.S. Application Data

(63) Continuation of application No. 13/156,053, filed on Jun. 8, 2011, now Pat. No. 8,840,301.

(60) Provisional application No. 61/352,544, filed on Jun. 8, 2010.

(51) Int. Cl.
| G01K 7/00 | (2006.01) |
| G01K 15/00 | (2006.01) |
| G01K 7/18 | (2006.01) |
| G01K 7/02 | (2006.01) |

(52) U.S. Cl.
CPC ............ *G01K 15/005* (2013.01); *G01K 7/02* (2013.01); *G01K 7/18* (2013.01); *G01K 15/007* (2013.01)

(58) Field of Classification Search
USPC .............. 374/179, 1, 183, 112, 166, 142
See application file for complete search history.

(56) References Cited

U.S. PATENT DOCUMENTS

| 4,538,927 A * | 9/1985 | Jochemczyk ............ G01K 7/02 374/163 |
| 5,887,978 A * | 3/1999 | Lunghofer ............ G01K 15/00 374/163 |
| 6,054,678 A * | 4/2000 | Miyazaki ............... B23K 3/033 219/229 |
| 7,175,343 B2 * | 2/2007 | Phillips ..................... G01K 7/04 374/180 |
| 7,841,771 B2 * | 11/2010 | Perotti ................... G01K 7/026 374/170 |
| 8,840,301 B2 * | 9/2014 | Hashemian ............. G01K 7/18 374/1 |
| 2002/0159500 A1 * | 10/2002 | Green ..................... G01K 1/10 374/179 |

(Continued)

*Primary Examiner* — Mirellys Jagan
(74) *Attorney, Agent, or Firm* — Pitts & Lake, P.C.

(57) ABSTRACT

A temperature detector and method of measuring temperature to obtain temperature readings in environments, such as fluids and gasses, by measuring electrical characteristics of the temperature detector that are influenced by the temperature. The temperature detector can be arranged such that a plurality of measurements can be obtained to provide sufficient diversity and redundancy of the measurements for enhanced diagnostics to be performed, such as optimization for fast dynamic response, calibration stability, in-situ response time testability, and in-situ calibration testability.

15 Claims, 6 Drawing Sheets

(56) References Cited

U.S. PATENT DOCUMENTS

2009/0030634 A1\* 1/2009 Schumacher ............ G01K 3/06
702/85

\* cited by examiner

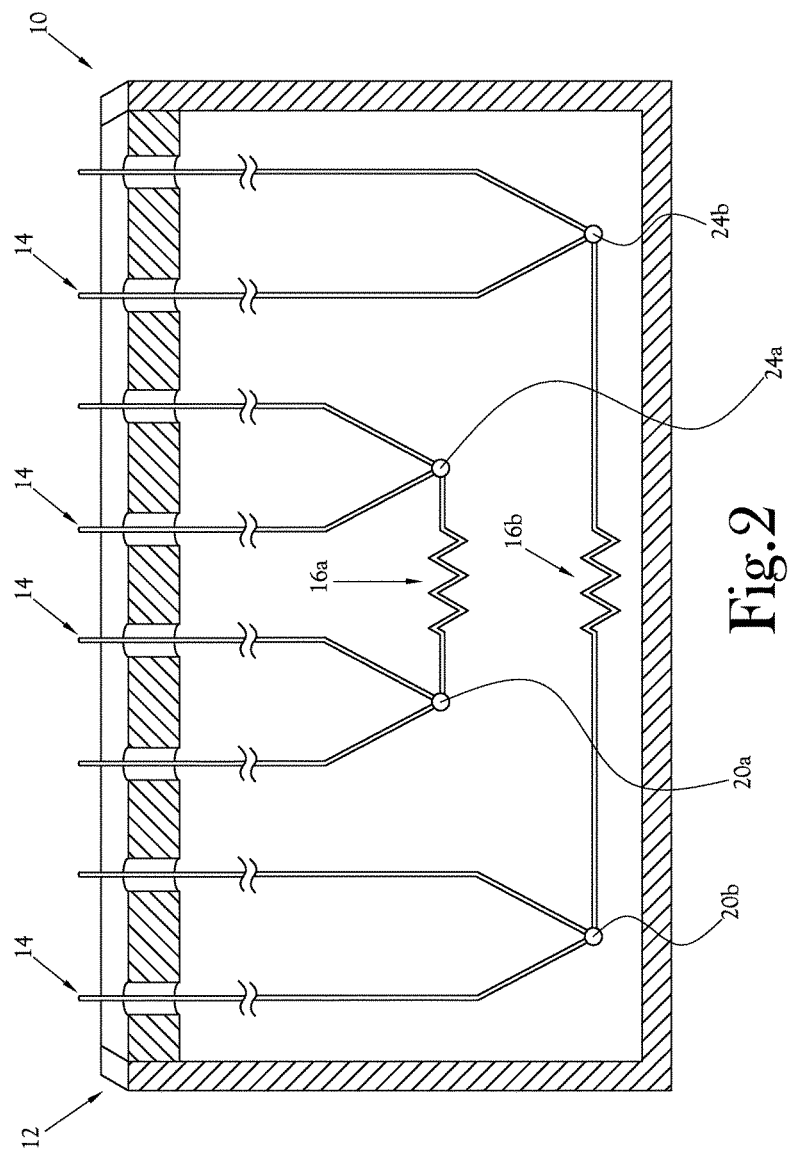

SYSTEMS AND METHODS OF MEASURING TEMPERATURE IN INDUSTRIAL ENVIRONMENTS

CROSS-REFERENCE TO RELATED APPLICATIONS

This is a continuation of U.S. patent application Ser. No. 13/156,053, filed on Jun. 8, 2011, which claims the benefit of U.S. Provisional Patent Application No. 61/352,544, filed on Jun. 8, 2010.

BACKGROUND OF THE INVENTION

1. Field of the Invention

This invention relates to temperature sensors, and more particularly, to resistance temperature detectors and diagnostic systems.

2. Description of the Related Art

A Resistance Temperature Detector ("RTD") is commonly used for sensing the temperature of an environment by measuring the electrical characteristics of the RTD. More specifically, each RTD includes circuitry with electrical characteristics, e.g., resistance, that change depending on the ambient temperature of the RTD's environment. The respective relationships between each RTD's electrical characteristics and the temperature are generally known for each type of RTD. Accordingly, a RTD is selected for a particular application based upon the RTD's electrical characteristics, the temperatures of the environment, the RTD's responsiveness, or another desired factor. For example, a RTD can be selected because of its ability to measure extreme temperatures of an industrial process. In some of these industrial environments, the temperatures measured by the RTD provide critical temperature data used by the process control and safety systems.

BRIEF SUMMARY OF THE INVENTION

A diverse and redundant resistance temperature detector ("D&R RTD") is described herein and illustrated in the accompanying figures. The D&R RTD is utilized in obtaining temperature readings in environments, such as fluids and gasses, by measuring electrical characteristics of the D&R RTD that are influenced by the temperature.

The D&R RTD includes a plurality of sensing components configured to undergo largely predictable changes in electrical characteristics when influenced by the D&R RTD's ambient temperature. For example, one embodiment of the single-element D&R RTD includes four thermocouple wires arranged such that a first pair of thermocouple wires is connected to a first lead of a sensing element at a first thermocouple junction first and a second pair of the thermocouple wires is connected to a lead of the sensing element at a second thermocouple junction. Thus, the single-element D&R RTD includes a total of three temperature sensing components, namely the sensing element, the first thermocouple junction, and the second thermocouple junction, to redundantly measure the environment's temperature. For another example, one embodiment of a dual-element D&R RTD includes dual sensing elements wherein each sensing element has a four-wire configuration and two thermocouple junctions. Thus, the dual-element D&R RTD provides six sensing component measurements, namely a first sensing element measurement, two measurements for two thermocouple junctions for the first sensing element, a second sensing element measurement, and two measurements for two thermocouple junctions for the second sensing element.

In addition to providing redundancy, the D&R RTD also provides diversity by allowing multiple methods of obtaining measurements to be utilized in measuring the electrical characteristics of the sensing element and the thermocouple junctions. For example, in one embodiment, the method of obtaining measurements from the sensing element is based on RTD techniques while the method of obtaining measurements from the thermocouple junctions is based on a thermocouple technique.

The D&R RTD's can be arranged such that a plurality of measurements to be obtained, which provides sufficient diversity and redundancy of the measurements for enhanced diagnostics to be performed, such as optimization for fast dynamic response, calibration stability, in-situ response time testability, and in-situ calibration testability. Other enhanced diagnostics that can be performed include deriving the D&R RTD transfer function, and using the D&R RTD measurements to provide input to a Johnson noise thermometer to measure absolute temperature.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a temperature detector including a first sensing element having a first lead and a second lead, the first sensing element having a electrical characteristic that varies in response to temperature, the electrical characteristic having a substantially linear variation over a selected temperature range and corresponding to a first temperature measurement, a first pair of thermocouple wires connected to the first lead of the first sensing element at a first thermocouple junction and extending from the first thermocouple junction to define a first pair of connection points, the first thermocouple junction having an electrical characteristic that varies in response to temperature, the electrical characteristic having a substantially linear variation over a selected temperature range and corresponding to a second temperature measurement, a second pair of thermocouple wires connected to the second lead of the first sensing element at a second thermocouple junction and extending from the second thermocouple junction to define a second pair of connection points, the second thermocouple junction having an electrical characteristic that varies in response to temperature, the electrical characteristic having a substantially linear variation over a selected temperature range and corresponding to a third temperature measurement, a second sensing element having a first lead and a second lead, the sensing element having a electrical characteristic that varies in response to temperature, the electrical characteristic having a substantially linear variation over a selected temperature range and corresponding to a fourth temperature measurement, a third pair of thermocouple wires connected to the first lead of the second sensing element at a first thermocouple junction and extending from the first thermocouple junction to define a third pair of connection points, the third thermocouple junction having an electrical characteristic that varies in response to temperature, the electrical characteristic having a substantially linear variation over a selected temperature range and corresponding to a fifth temperature measurement, a fourth pair of thermocouple wires connected to the second lead of the second sensing element at a second thermocouple junction and extending from the second thermocouple junction to define a fourth pair of connection points, the fourth thermocouple junction having an electrical characteristic that varies in response to temperature, the electrical characteristic having a substantially linear variation over a selected temperature range and corresponding to a sixth temperature measurement, and a diagnostic unit configured to process the temperature measurements such that the first temperature measurement is acquired by measuring the electrical characteristic of the first sensing element using one of the first pair of connection points and one of the second pair of connection points, the second temperature measurement is acquired by measuring the electrical characteristic of the first thermocouple junction using the first pair of connection points, the third temperature measurement is acquired by measuring the electrical characteristic of the second thermocouple junction by using the second pair of connection points, the fourth temperature measurement is acquired by measuring the electrical characteristic of the second sensing element using one of the third pair of connection points and one of the fourth pair of connection points, the fifth temperature measurement is acquired by measuring the electrical characteristic of the third thermocouple junction using the third pair of connection points, and the sixth temperature measurement by measuring the electrical characteristic of the fourth thermocouple junction by using the fourth pair of connection points, wherein the diagnostic unit processes the temperature measurements such that the first, second, third, fourth, fifth, and sixth temperature measurements are cross calibrated by determining an average temperature therefor, determining a deviation from the average temperature for each of the first, second, third, fourth, fifth, and sixth temperature measurements, and calculating a calibration coefficient for each of the first, second, third, fourth, fifth, and sixth temperature measurements.

The thermocouple wires may pass through an isothermal block that regulates the thermocouple reference junction to equilibrium thereby minimizing axial heat transfer.

The first through sixth temperature measurements may be calculated to generate redundancy for cross calibration to enhance diagnostics to optimize one or more of dynamic response, calibration stability, in-situ response time testability, and in-situ calibration testability.

The temperature detector may further include a thermowell housing the sensing elements and thermocouple junctions.

The temperature detector may further include a sheath enclosing the sensing element and thermocouple junctions.

The temperature detector may further include an air gap between the sheath and the thermowell to allow for the expansion of materials and to ensure that the sensing elements are not damaged.

The temperature detector may further include a thermal coupling compound disposed in the air gap.

The foregoing and/or other aspects and advantages of the present general inventive concept may also be achieved by a temperature detector including a sensing element having a first lead and a second lead, the sensing element having a electrical characteristic that varies in response to temperature, the electrical characteristic having a substantially linear variation over a selected temperature range and corresponding to a first temperature measurement, a first pair of thermocouple wires connected to the first lead at a first thermocouple junction and extending from the first thermocouple junction to define a first pair of connection points, the first thermocouple junction having an electrical characteristic that varies in response to temperature, the electrical characteristic having a substantially linear variation over a selected temperature range and corresponding to a second temperature measurement, a second pair of thermocouple wires connected to the second lead at a second thermocouple junction and extending from the second thermocouple junction to define a second pair of connection points, the second thermocouple junction having an electrical characteristic that varies in response to temperature, the electrical characteristic having a substantially linear variation over a selected temperature range and corresponding to a third temperature measurement, a thermowell enclosing the sensing element, the first thermocouple junction and the second thermocouple junction, and a diagnostic unit configured to process the temperature measurements such that the first temperature measurement is acquired by measuring the electrical characteristic of the sensing element using one of the first pair of connection points and one of the second pair of connection points, the second temperature measurement is acquired by measuring the electrical characteristic of the first thermocouple junction using the first pair of connection points, and the third temperature measurement is acquired by measuring the electrical characteristic of the second thermocouple junction by using the second pair of connection points, wherein the diagnostic unit processes the temperature measurements such that the first temperature measurement, the second temperature measurement and the third temperature measurement are cross calibrated by determining an average temperature therefor, determining a deviation from the average temperature for each of the first temperature measurement and the second temperature measurement and the third temperature measurement, and calculating a calibration coefficient for each of the first temperature measurement and the second temperature measurement and the third temperature measurement.

The first temperature measurement may be the electrical resistance between one of the first pair of connection points and one of the second pair of connection points upon a current being supplied thereto.

The thermocouple wires may pass through an isothermal block that regulates the thermocouple reference junction to equilibrium thereby minimizing axial heat transfer.

The temperature detector may further include a sheath enclosing the sensing element and thermocouple junctions.

The temperature detector may further include an air gap between the sheath and the thermowell to allow for the expansion of materials and to ensure that the sensing element is not damaged.

The first, second, and third temperature measurements may be calculated to generate redundancy for cross calibration to enhance diagnostics to optimize one or more of dynamic response, calibration stability, in-situ response time testability, and in-situ calibration testability.

The foregoing and/or other aspects and advantages of the present general inventive concept may also be achieved by a method of measuring temperature including measuring a first temperature utilizing a sensing element having a first lead and a second lead, the sensing element having an electrical characteristic that varies in response to temperature, the electrical characteristic having a substantially linear variation over a first selected temperature range, measuring a second temperature utilizing a first pair of thermocouple wires connected to the first lead at a first thermocouple junction and extending from the first thermocouple junction to define a first pair of connection points, the first thermocouple junction having an electrical characteristic that varies in response to temperature, the electrical characteristic having a substantially linear variation over a second selected temperature range, measuring a third temperature utilizing a second pair of thermocouple wires connected to the second lead at a second thermocouple junction and extending from the second thermocouple junction to define a second pair of connection points, the second thermocouple junction having an electrical characteristic that varies in response to temperature, the electrical characteristic having a substantially linear variation over a third selected temperature range, processing the temperature measurements such that the first temperature measurement is acquired by measuring the electrical characteristic of the sensing element using one of the first pair of connection points and one of the second pair of connection points, the second temperature measurement is acquired by measuring the electrical characteristic of the first thermocouple junction using the first pair of connection points, and the third temperature measurement is acquired by measuring the electrical characteristic of the second thermocouple junction by using the second pair of connection points, and cross-calibrating the first, second and third temperature measurements by determining an average temperature therefor, determining a deviation from the average temperature for each of the first temperature measurement and the second temperature measurement and the third temperature measurement, and calculating calibration coefficients for each of the first temperature measurement and the second temperature measurement and the third temperature measurement.

The method may further include deriving a transfer function for a temperature detector by using a thermocouple junction signal as an input and a sensing element signal as an output.

Other features and aspects may be apparent from the following detailed description, the drawings, and the claims.

BRIEF DESCRIPTION OF THE SEVERAL VIEWS OF THE DRAWINGS

The above-mentioned and additional features of the invention will become more clearly understood from the following detailed description of the invention read together with the drawings in which:

FIG. 2 is an illustration of a schematic of one embodiment of a D&R RTD, which has multiple sensing elements, in a thermowell;

DETAILED DESCRIPTION OF THE INVENTION

A diverse and redundant resistance temperature detector ("D&R RTD") is described in detail herein and illustrated in the accompanying figures. The D&R RTD is utilized in obtaining temperature readings in environments, such as fluids and gasses, by measuring electrical characteristics of the D&R RTD that are influenced by the temperature. Furthermore, the D&R RTD's are arranged such that a plurality of measurements can be obtained, which provides sufficient diversity and redundancy of the measurements for enhanced diagnostics to be performed, such as optimization for fast dynamic response, calibration stability, in-situ response time testability, and in-situ calibration testability.

Figure 1:
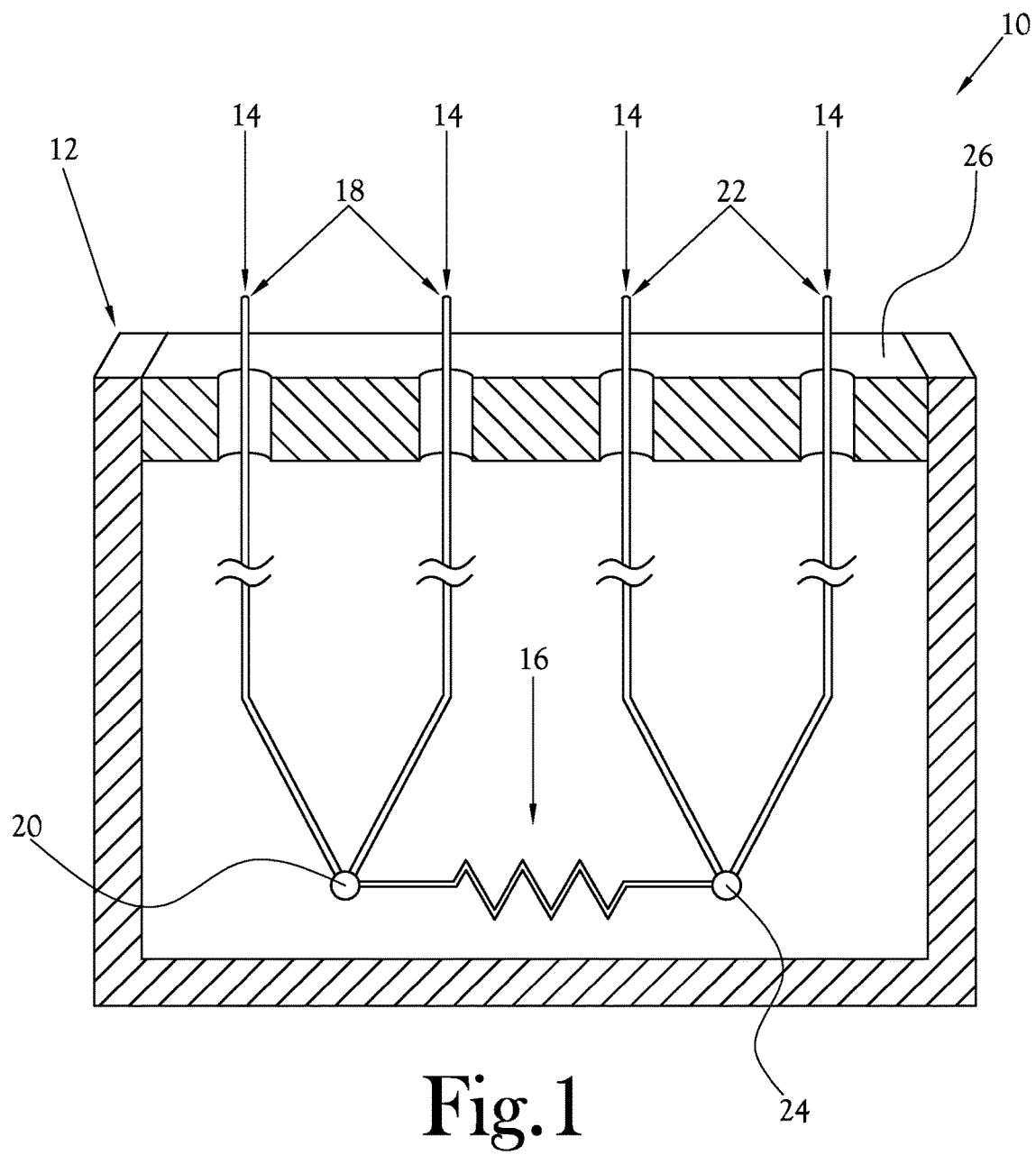
FIG. 1 is an illustration of a schematic of one embodiment of a diverse and redundant resistance temperature detector ("D&R RTD") in a thermowell.

FIG. 1 illustrates a schematic of one embodiment of a diverse and redundant resistance temperature detector ("D&R RTD") 10 in a thermowell 12. The D&R RTD includes a plurality of sensing components configured to undergo largely predictable changes in electrical characteristics when influenced by the D&R RTD's 10 ambient temperature. In the illustrated embodiment, the D&R RTD 10 includes four thermocouple wires 14 in electrical communication with a single sensing element 16. As depicted, the D&R RTD 10 includes two pair of the thermocouple wires 14 arranged in a parallel configuration with the sensing element 16. Specifically, a first pair of thermocouple wires 18 is connected to a first lead of the sensing element 16 at a first thermocouple junction 20 and a second pair of thermocouple wires 22 is connected to a second lead of the sensing element 16 at a second thermocouple junction 24. Thus, the D&R RTD 10, depicted in FIG. 1, includes a total of three temperature sensing components, namely the sensing element 16, the first thermocouple junction 20, and the second thermocouple junction 24, to redundantly measure the environment's temperature. It is possible to connect the temperature detector 10 to a diagnostic unit to combine, process, and calculate the temperature measurements to provide a diagnostics system capable of generating enhanced diagnostics information based on redundancy of the temperature measurements for cross calibration to optimize one or more of dynamic response, calibration stability, in-situ response time testability, and in-situ calibration testability of the system.

The D&R RTD 10 allows for measuring the electrical characteristics of each of these sensing components. Specifically, in one embodiment, the electrical characteristic of the sensing element 16 is measured between one thermocouple wire 14 of the first pair of thermocouple wires 18 and one thermocouple wire 14 of the second pair of thermocouple wires 22. While the electrical characteristic of the first thermocouple junction 20 is obtained by measuring the electrical characteristic between the first pair of thermocouple wires 18 and the electrical characteristic of the second thermocouple junction 24 is obtained by measuring the electrical characteristic between the second pair of thermocouple wires 22.

In addition to providing redundancy, the D&R RTD 10 also provides diversity by allowing multiple methods of obtaining measurements to be utilized in measuring the electrical characteristics of the sensing element 16 and the thermocouple junctions 20, 24. Specifically, in one embodiment, the method of obtaining measurements from the sensing element 16 is based on RTD techniques while the method of obtaining measurements from the thermocouple junctions 20, 24 is based on a thermocouple technique. For example, one suitable method to obtain measurements from the sensing element 16 is to measure the resistance of the sensing element 16 upon a current being supplied thereto. One suitable method to obtain measurements from the thermocouple junction 20, 24 is to measure the Seebeck voltage of the thermocouple junction 20, 24 when the thermocouple junction 20, 24 is subjected to a change in temperature. In the embodiment illustrated in FIG. 1, the Seebeck voltage measurements are further simplified by passing the thermocouple wires 14 through an isothermal block 26 that regulates the thermocouple reference junction to equilibrium. Thus, the D&R RTD 10 provides redundant measurements through diverse methods to improve the reliability and accuracy of the temperature measurements.

Alternate embodiments of the D&R RTD 10 can include multiple sensing elements 16 and thermocouple junctions 20, 24 to further improve the diversity and redundancy of the temperature measurements.

FIG. 2 illustrates a schematic of one embodiment of a D&R RTD 10, which has multiple sensing elements, in a thermowell 12. In the illustrated embodiment, the D&R RTD 10 includes dual sensing elements 16a, 16b wherein each sensing element 16a, 16b has a four-wire thermocouple 14 configuration and two thermocouple junctions 20a, 20b, 20c, 20d. Thus, the D&R RTD 10 with dual sensing elements provides six sensing components 16a, 16b, 20a, 20b, 20c, 20d that measure the same temperature. These six measurements include one measurement for the first sensing element 16a, two measurements for the thermocouple junctions 20a, 24a for the first sensing element 16a, one measurement for the second sensing element 16b, and two measurements for the thermocouple junctions 20b, 24b for the second sensing element 16b. Moreover, the D&R RTD 10 with dual sensing elements 16a, 16b continues to use two different techniques to measure the ambient temperature, thereby maintaining diversity while increasing the redundancy of the measurements.

As mentioned above, the D&R RTD 10 is arranged such that the plurality of measurements provides sufficient diagnostics. For example, the D&R RTD 10 is configured to allow traditional and in-situ calibration testing to be performed on the D&R RTD 10. Calibration testing provides an indication of whether a sensing element 16 or a thermocouple junction 20, 24 is faulty, and also whether a sensing element 16 or the thermocouple junction 20, 24 is deviating from a linear relationship with the temperature. The cross calibration technique is one method for verifying calibration on the D&R RTD 10. Generally, cross calibration includes obtaining measurements from the D&R RTD 10, determining the average temperature, determining deviations there from, and determining calibration coefficients for the deviating measurements of the D&R RTD 10. For the cross calibration technique, it is important to obtain at least three measurements of the same temperature, from one or more D&R RTDs 10, in order to obtain accurate calibration information. For example, the D&R RTD 10 with dual sensing elements 16a, 16b provides six measurements for cross calibration wherein the redundant measurements are analyzed for determination of whether the measurements are in conformance with one another. It should be noted that cross calibration can be performed provided that the D&R RTD 10 does not experience a common mode effect that influences or skews the measurements similarly. This assumption can be generally accepted because the D&R RTD 10 is fault tolerant and essentially immune from common mode failures. Again, because the D&R RTD 10 measurements are obtained from two sources, namely the sensing element and the thermocouple junctions 20, 24, and because the measurements are obtained through different methods, it is highly unlikely that the D&R RTD 10 will experience common mode failures for all the sources of measurements. Furthermore, the D&R RTD 10 with dual sensing elements 16a, 16b is configured for fault tolerance to insure that accurate measurements are still obtainable when conventional RTDs normally suffer from cold working due to vibration.

The D&R RTD 10 also allows for additional enhanced diagnostics to be performed. For example, a D&R RTD 10 transfer function can be derived using the thermocouple junction signal as input and the sensing element signal as output. Additionally, if additional temperature information is desired, the D&R RTD 10 measurements can serve to provide input to a Johnson noise thermometer to measure absolute temperature.

Figure 3A:
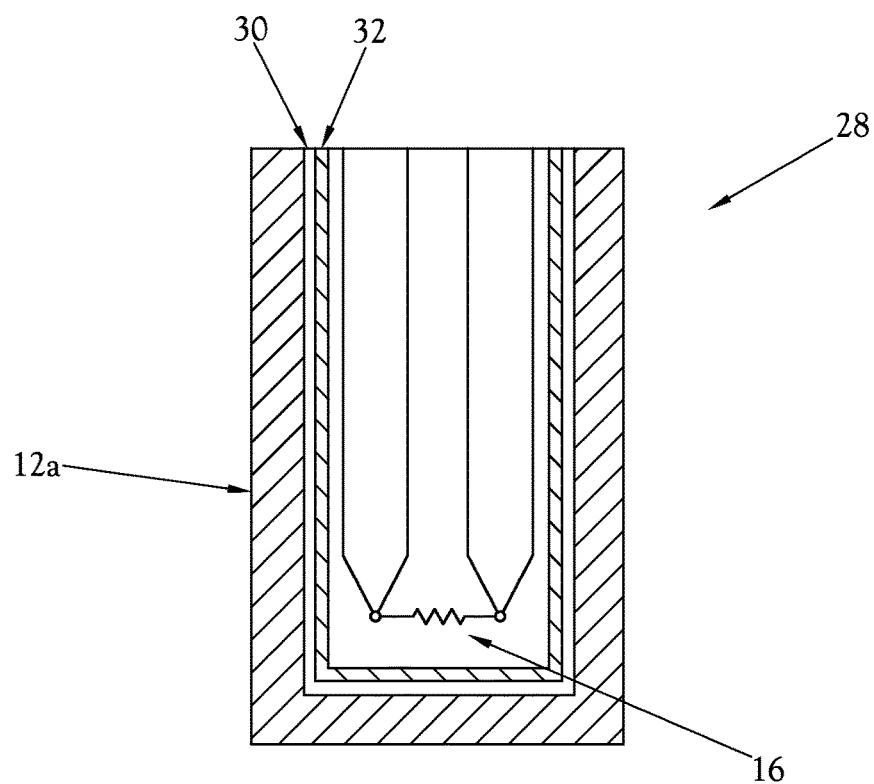
FIG. 3*a* is an illustration of one configuration of a D&R RTD-in-thermowell assembly.
Figure 3B:
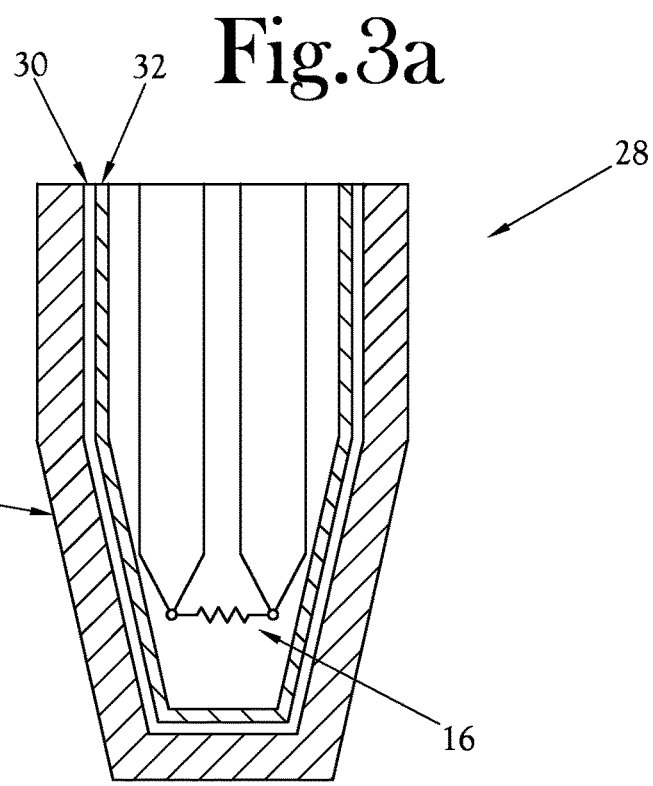
FIG. 3*b* is an illustration of one configuration of a D&R RTD-in-thermowell assembly.

FIGS. 3a and 3b illustrate two configurations of a D&R RTD-in-thermowell assembly 28. For demonstrative purposes, a D&R RTD 10 having a single sensing element 16 is shown housed within a flat-tip thermowell 12a in FIG. 3a and a tapered-tip thermowell 12b in FIG. 3b. One consideration in selecting the shape of the thermowell 12 is the amount and types of static and dynamic forces in the environment for which the D&R RTD 10 is selected. As shown in FIGS. 3a and 3b, the D&R RTD-in-thermowell assembly 28 also includes an air gap 30 and a sheath 32. The thermowell 28, the air gap 30, and the sheath 32 protect the D&R RTD 10 from damage by isolating the D&R RTD 10 from direct contact with the environment; however, this protection also insulates the D&R RTD 10 and slows down the response time. The response time is the amount of time it takes the temperature sensor to observe the change in temperature. Although the quickest manner of heat transfer between the thermowell 12 and D&R RTD 10 occurs when there is contact there between, the expansion of materials often results in damage to the sensing element 16. Accordingly, an air gap is necessary to allow for the expansion of materials and to ensure that the D&R RTD 10 is not damaged.

Figure 4:
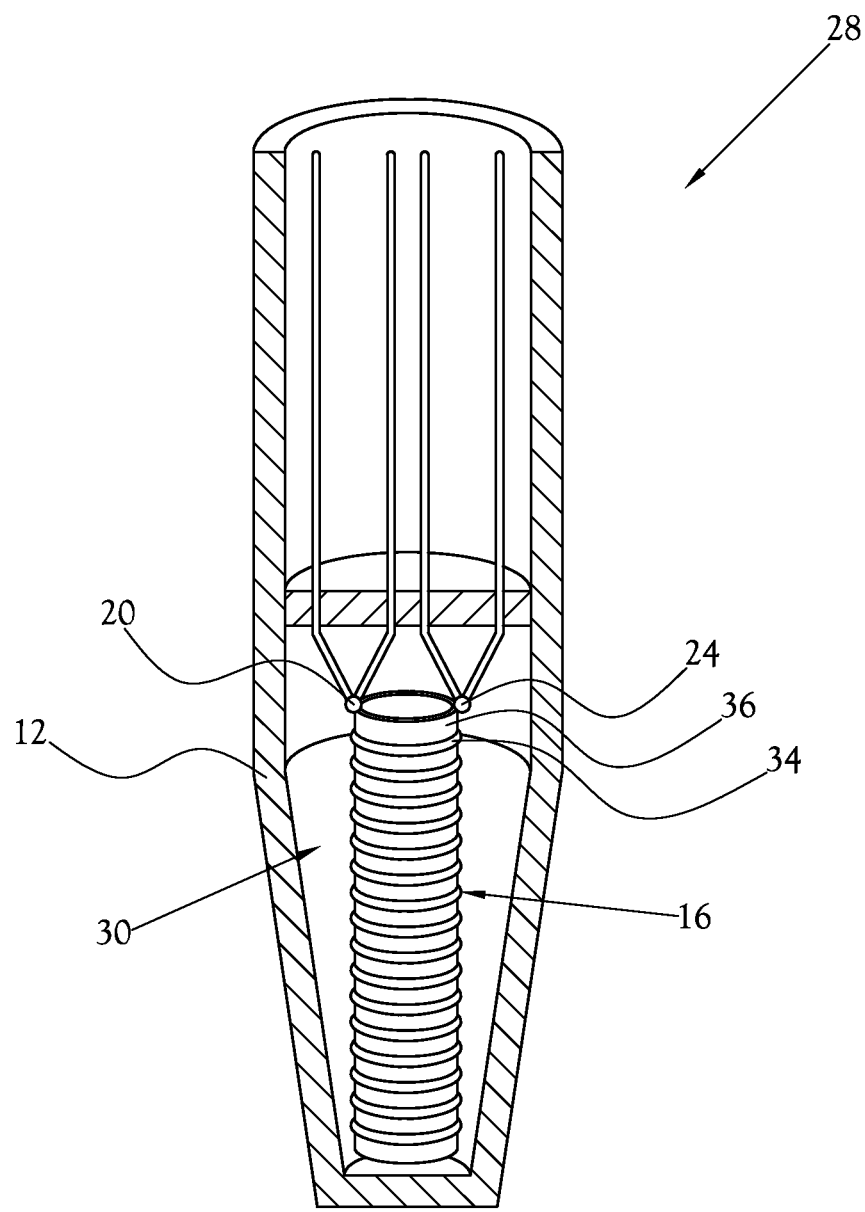
FIG. 4 is an illustration of one embodiment of a D&R RTD configured for radial heat transfer.

FIG. 4 illustrates one embodiment of the D&R RTD-in-thermowell assembly 28 configured to promote the radial heat transfer and reduce axial heat transfer. By reducing axial heat transfer, the D&R RTD 10 provides additional enhanced diagnostics. A brief discussion of the embodiment illustrated in FIG. 4 will aid in the understanding of why these additional diagnostics are available. In FIG. 4, the D&R RTD-in-thermowell assembly 28 includes a tapered-tip thermowell 12 and a D&R RTD 10. The D&R RTD 10 includes a wire-wound sensing element 16, namely a wire 34 wound around a mandrel 36 made of an electrically insulating material. The materials utilized in the D&R RTD 10 depend upon the minimum and maximum temperatures of the environment and the degree of linearity between the D&R RTD's 10 electrical characteristics and these minimum and maximum temperatures. For example, a suitable selection for a wire-wound sensing element 16, which is subjected to high temperatures in industrial processes, includes a platinum wire 34 secured on an $Al_2O_3$ or MgO mandrel 36. The D&R RTD-in-thermowell assembly 28 also includes insulation to inhibit axial heat transfer and promote radial heat transfer for the sensing element. More specifically, the insulation is packed above the sensing element to keep the heat at the tip and minimizing axial heat transfer. Thus, the D&R RTD 10 is isolated from other environments (such as the environment where the thermocouple wires extend) such that the D&R RTD 10 is predominately influenced by the environment's temperature with minimal dissipation. Thus, the D&R RTD's 10 measurements substantially reflect the temperature of the environment.

As mentioned above, the D&R RTD-in-thermowell assembly 28 configured to promote the radial heat transfer and reduce axial heat transfer allows additional diagnostics to be performed. For example, the D&R RTD 10 allows for in-situ response time testing. One suitable method of performing in-situ response time testing is the loop current step response ("LCSR") technique. LCSR testing measures the response time of the D&R RTD 10 under process operating conditions. For example, a suitable response time for the D&R RTD-in-thermowell assembly 28 is a response time of less than 5 s in a fluid with a flow rate of 1 m/s.

In addition to response time, the D&R RTD 10 allows for enhanced diagnostics and monitoring of the air gap 30 between the sensing element 16 and the thermowell 12. LCSR is also one suitable method of determining the distance of the air gap 30. It should be noted that the LCSR testing provides an indication of the distance as it exists at the present temperature. Accordingly, based upon the LCSR results, the D&R RTD-in-thermowell assembly 28 is selectable such that a particular D&R RTD 10 optimizes the air gap 30. Specifically, the D&R RTD 10 having a desired air gap 30 is selected based on previous measurements at the temperature such that the D&R RTD-in-thermowell 28 is optimized to provide the quickest response time while still providing a sufficient air gap 30 for thermal expansion. Thus, the enhanced diagnostics allow the D&R RTD 10 to be selected for optimization of the system.

Furthermore, LCSR testing also provides for differentiation between problems experienced by the sensing element 16 or thermocouple junctions 20, 24 and problems which are experienced by a cable or connector. That is, if the D&R RTD 10 signal becomes anomalous, one can diagnose whether the problem is in the D&R RTD 10 or in the cables and connectors between the D&R RTD 10 and the instrumentation cabinets.

Figure 5A:
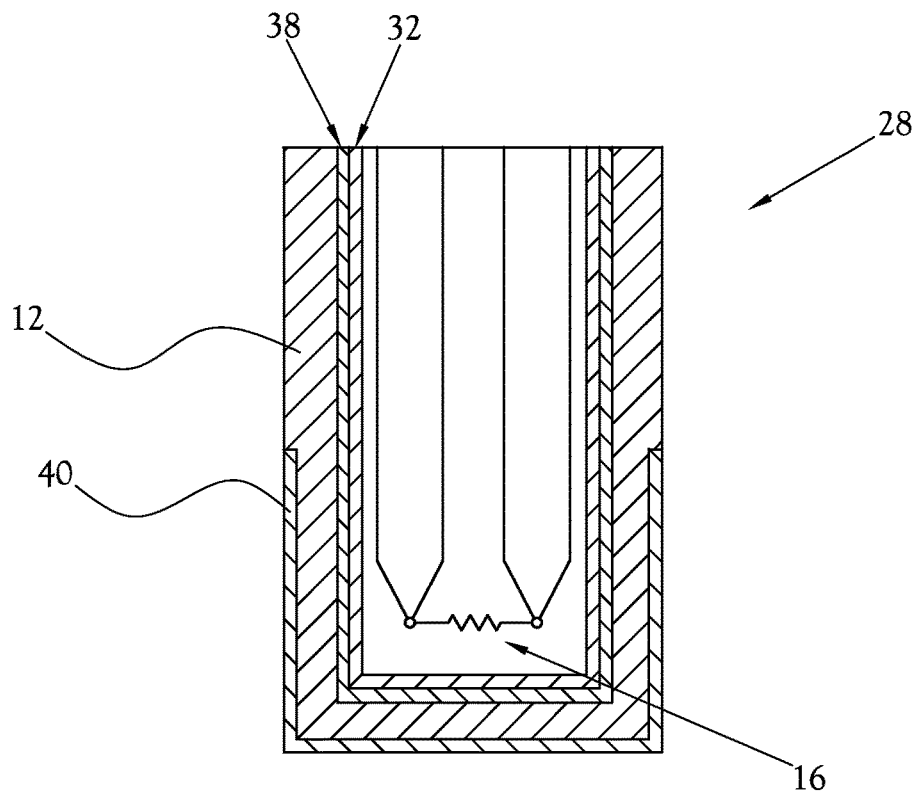
FIG. 5*a* is an illustration of one embodiment of a D&R RTD-in-thermowell assembly.
Figure 5B:
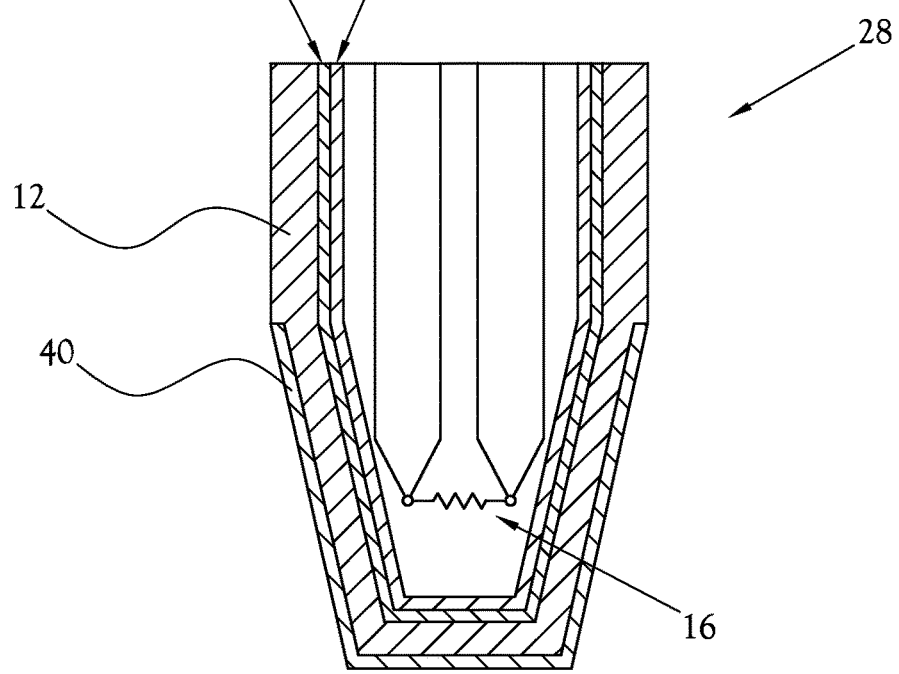
FIG. 5*b* is an illustration of one embodiment of a D&R RTD-in-thermowell assembly.

FIGS. 5a and 5b illustrate two embodiments of a D&R RTD-in-thermowell assembly 28. More specifically, the depicted D&R RTD-in-thermowell assemblies 28 include a flat tipped thermowell with plating (FIG. 5a), and a tapered tip thermowell with plating (FIG. 5b). The D&R RTD-in-thermowell assemblies 28, of FIGS. 5a-5d, further include a thermal coupling compound 38 that occupies the area between the sheath 32 and inside wall of the thermocouple 12, thereby replacing the air gap. The thermal coupling compound 38 produces an accelerated dynamic response while allowing for the expansion of materials. Additionally, the D&R RTD-in-thermowell assemblies 28, include plating 40 that further accelerates the dynamic response. Alternate embodiments of the D&R RTD-in-thermowell assembly can include any other desired configuration with a suitable response time.

Figure 6:
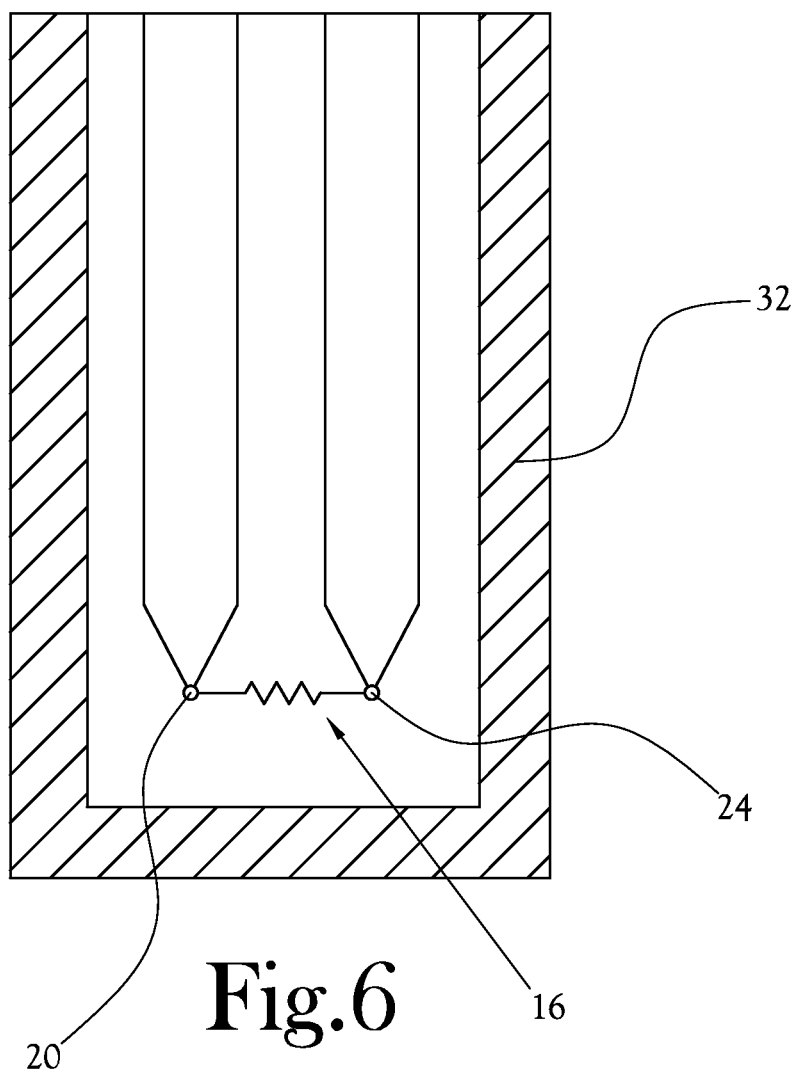
FIG. 6 is an illustration of an alternate embodiment of a D&R RTD.

FIG. 6 illustrates an alternate embodiment of a D&R RTD 10. In some applications that necessitate a faster response time than can be achieved using the D&R RTD-in-thermowell 28, a wet-type D&R RTD 10 can be used. A wet-type D&R RTD 10 omits the thermowell and uses materials selected to improve the expected lifespan and performance characteristics (e.g., linearity, temperature range) of the wet-type D&R RTD 10 based on the environmental conditions for which it is designed. For example, in the illustrated embodiment, the D&R RTD 10 includes a sensing element 16 and two thermocouple junctions 20, 24 enclosed within a sheath 32. Factors that affect the expected lifespan and performance include thermal expansion, stress and strain, and corrosion of the components. One suitable selection for the wet-type D&R RTD 10 is a platinum sensing element with Type K (chromel-alumel) thermocouples.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A temperature detector comprising:
    a first sensing element having a first lead and a second lead, said first sensing element having a electrical characteristic that varies in response to temperature, said electrical characteristic having a substantially linear variation over a selected temperature range and corresponding to a first temperature measurement;
    a first pair of thermocouple wires connected to said first lead of said first sensing element at a first thermocouple junction and extending from said first thermocouple junction to define a first pair of connection points, said first thermocouple junction having an electrical characteristic that varies in response to temperature, said electrical characteristic having a substantially linear variation over a selected temperature range and corresponding to a second temperature measurement;
    a second pair of thermocouple wires connected to said second lead of said first sensing element at a second thermocouple junction and extending from said second thermocouple junction to define a second pair of connection points, said second thermocouple junction having an electrical characteristic that varies in response to temperature, said electrical characteristic having a substantially linear variation over a selected temperature range and corresponding to a third temperature measurement;
    a second sensing element having a first lead and a second lead, said second sensing element having an electrical characteristic that varies in response to temperature, said electrical characteristic having a substantially linear variation over a selected temperature range and corresponding to a fourth temperature measurement;
    a third pair of thermocouple wires connected to said first lead of said second sensing element at a third thermocouple junction and extending from said third thermocouple junction to define a third pair of connection points, said third thermocouple junction having an electrical characteristic that varies in response to temperature, said electrical characteristic having a substantially linear variation over a selected temperature range and corresponding to a fifth temperature measurement;
    a fourth pair of thermocouple wires connected to said second lead of said second sensing element at a fourth thermocouple junction and extending from said fourth thermocouple junction to define a fourth pair of connection points, said fourth thermocouple junction having an electrical characteristic that varies in response to temperature, said electrical characteristic having a substantially linear variation over a selected temperature range and corresponding to a sixth temperature measurement; and
    a diagnostic unit configured to process said temperature measurements such that said first temperature measurement is acquired by measuring the electrical characteristic of said first sensing element using one of said first pair of connection points and one of said second pair of connection points, said second temperature measurement is acquired by measuring the electrical characteristic of said first thermocouple junction using said first pair of connection points, said third temperature measurement is acquired by measuring said electrical characteristic of said second thermocouple junction by using said second pair of connection points, said fourth temperature measurement is acquired by measuring the electrical characteristic of said second sensing element using one of said third pair of connection points and one of said fourth pair of connection points, said fifth temperature measurement is acquired by measuring the electrical characteristic of said third thermocouple junction using said third pair of connection points, and said sixth temperature measurement by measuring said electrical characteristic of said fourth thermocouple junction by using said fourth pair of connection points;

wherein the diagnostic unit processes said temperature measurements such that said first, second, third, fourth, fifth, and sixth temperature measurements are cross calibrated by determining an average temperature therefor, determining a deviation from the average temperature for each of the first, second, third, fourth, fifth, and sixth temperature measurements, and calculating a calibration coefficient for each of the first, second, third, fourth, fifth, and sixth temperature measurements.

2. The temperature detector of claim 1, wherein said thermocouple wires pass through an isothermal block that regulates the thermocouple reference junction to equilibrium thereby minimizing axial heat transfer.

3. The temperature detector of claim 1, wherein said first through sixth temperature measurements are calculated to generate redundancy for cross calibration to enhance diagnostics to optimize one or more of dynamic response, calibration stability, in-situ response time testability, and in-situ calibration testability.

4. The temperature detector of claim 1, further comprising a thermowell housing the sensing elements and thermocouple junctions.

5. The temperature detector of claim 4, further comprising a sheath enclosing the sensing elements and thermocouple junctions.

6. The temperature detector of claim 5, further comprising an air gap between the sheath and said thermowell to allow for the expansion of materials and to ensure that the sensing elements are not damaged.

7. The temperature detector of claim 6, further comprising a thermal coupling compound disposed in the air gap.

8. A temperature detector comprising:
a sensing element having a first lead and a second lead, said sensing element having a electrical characteristic that varies in response to temperature, said electrical characteristic having a substantially linear variation over a selected temperature range and corresponding to a first temperature measurement;
a first pair of thermocouple wires connected to said first lead at a first thermocouple junction and extending from said first thermocouple junction to define a first pair of connection points, said first thermocouple junction having an electrical characteristic that varies in response to temperature, said electrical characteristic having a substantially linear variation over a selected temperature range and corresponding to a second temperature measurement;
a second pair of thermocouple wires connected to said second lead at a second thermocouple junction and extending from said second thermocouple junction to define a second pair of connection points, said second thermocouple junction having an electrical characteristic that varies in response to temperature, said electrical characteristic having a substantially linear variation over a selected temperature range and corresponding to a third temperature measurement;
a thermowell enclosing said sensing element, said first thermocouple junction and said second thermocouple junction; and
a diagnostic unit configured to process said temperature measurements such that said first temperature measurement is acquired by measuring the electrical characteristic of said sensing element using one of said first pair of connection points and one of said second pair of connection points, said second temperature measurement is acquired by measuring the electrical characteristic of said first thermocouple junction using said first pair of connection points, and said third temperature measurement is acquired by measuring said electrical characteristic of said second thermocouple junction by using said second pair of connection points;

wherein the diagnostic unit processes said temperature measurements such that said first temperature measurement, said second temperature measurement and said third temperature measurement are cross calibrated by determining an average temperature therefor, determining a deviation from the average temperature for each of the first temperature measurement and the second temperature measurement and the third temperature measurement, and calculating a calibration coefficient for each of the first temperature measurement and the second temperature measurement and the third temperature measurement.

9. The temperature detector of claim 8, wherein said first temperature measurement is the electrical resistance between one of said first pair of connection points and one of said second pair of connection points upon a current being supplied thereto.

10. The temperature detector of claim 8, wherein said thermocouple wires pass through an isothermal block that regulates the thermocouple reference junction to equilibrium thereby minimizing axial heat transfer.

11. The temperature detector of claim 8, wherein said first, second, and third temperature measurements are calculated to generate redundancy for cross calibration to enhance diagnostics to optimize one or more of dynamic response, calibration stability, in-situ response time testability, and in-situ calibration testability.

12. The temperature detector of claim 8, further comprising a sheath enclosing the sensing element and thermocouple junctions.

13. The temperature detector of claim 12, further comprising an air gap between the sheath and said thermowell to allow for the expansion of materials and to ensure that the sensing element is not damaged.

14. A method of measuring temperature comprising:
measuring a first temperature utilizing a sensing element having a first lead and a second lead, said sensing element having an electrical characteristic that varies in response to temperature, said electrical characteristic having a substantially linear variation over a first selected temperature range;
measuring a second temperature utilizing a first pair of thermocouple wires connected to said first lead at a first thermocouple junction and extending from said first thermocouple junction to define a first pair of connection points, said first thermocouple junction having an electrical characteristic that varies in response to temperature, said electrical characteristic having a substantially linear variation over a second selected temperature range;

measuring a third temperature utilizing a second pair of thermocouple wires connected to said second lead at a second thermocouple junction and extending from said second thermocouple junction to define a second pair of connection points, said second thermocouple junction having an electrical characteristic that varies in response to temperature, said electrical characteristic having a substantially linear variation over a third selected temperature range;

processing said temperature measurements such that said first temperature measurement is acquired by measuring said electrical characteristic of said sensing element using one of said first pair of connection points and one of said second pair of connection points, said second temperature measurement is acquired by measuring said electrical characteristic of said first thermocouple junction using said first pair of connection points, and said third temperature measurement is acquired by measuring said electrical characteristic of said second thermocouple junction by using said second pair of connection points; and cross-calibrating the first, second and third temperature measurements by determining an average temperature therefor, determining a deviation from the average temperature for each of the first temperature measurement and the second temperature measurement and the third temperature measurement, and calculating calibration coefficients for each of said first temperature measurement and said second temperature measurement and said third temperature measurement.

15. The method of claim 14, further comprising deriving a transfer function for a temperature detector by using a thermocouple junction signal as an input and a sensing element signal as an output.

* * * * *